(12) United States Patent
James et al.

(10) Patent No.: US 11,445,857 B2
(45) Date of Patent: Sep. 20, 2022

(54) AIR CIRCULATION SYSTEM AND METHOD

(71) Applicant: Dansons US, LLC, Phoenix, AZ (US)

(72) Inventors: Chris James, Phoenix, AZ (US); Andrew Koster, Gilbert, AZ (US)

(73) Assignee: Dansons US, LLC, Scottsdale, AZ (US)

( * ) Notice: Subject to any disclaimer, the term of this patent is extended or adjusted under 35 U.S.C. 154(b) by 369 days.

(21) Appl. No.: 16/710,504

(22) Filed: Dec. 11, 2019

(65) Prior Publication Data

US 2021/0177200 A1    Jun. 17, 2021

(51) Int. Cl.
*A47J 37/07* (2006.01)
*F24B 1/189* (2006.01)
*F24B 1/199* (2006.01)

(52) U.S. Cl.
CPC .......... *A47J 37/0713* (2013.01); *F24B 1/189* (2013.01); *F24B 1/199* (2013.01)

(58) Field of Classification Search
CPC ................ A47J 37/0704; A47J 37/0713; A47J 37/0754; F24B 1/199; F24B 13/04; F24B 1/024; F24B 1/189; F24B 7/04; F23B 60/00; F23B 3/00; F23K 3/14
See application file for complete search history.

(56) References Cited

U.S. PATENT DOCUMENTS

| | | | |
|---|---|---|---|
| 4,823,684 A | 4/1989 | Traeger et al. | |
| 5,251,607 A * | 10/1993 | Traeger ............... | A47J 37/0704 126/73 |
| 6,223,737 B1 * | 5/2001 | Buckner ................... | F23L 1/02 110/294 |
| 10,342,384 B2 * | 7/2019 | Allmendinger ..... | A47J 37/0722 |
| 11,026,543 B2 * | 6/2021 | Witzel ...................... | F23B 1/36 |
| 2011/0136066 A1 * | 6/2011 | Geselle ..................... | F23K 3/16 110/304 |
| 2015/0282668 A1 * | 10/2015 | Zhu ..................... | A47J 37/0704 126/25 R |
| 2018/0168397 A1 | 6/2018 | Colston | |
| 2018/0368618 A1 | 12/2018 | Measom et al. | |
| 2019/0274479 A1 | 9/2019 | Chung | |

(Continued)

FOREIGN PATENT DOCUMENTS

DE    102019107597    9/2019

OTHER PUBLICATIONS

Australian Examination Report No. 1 for Application No. 2020273348 dated Jun. 23, 2021, 6 pages.

(Continued)

*Primary Examiner* — Alfred Basichas
(74) *Attorney, Agent, or Firm* — Seyfarth Shaw LLP

(57) ABSTRACT

A cooking appliance is disclosed including a burner assembly that effectively and efficiently combusts fuel and directs the resulting smoke from a burn pot of the burner assembly to a cook chamber of a cooking appliance. The burner assembly may include a series of openings and curved faces that provide airflow to push smoke from the burn pot to the cook chamber and provide more turbulence and better heat and smoke circulation in the smoker. The burn pot may define one or more vents and include a one or more curved or shrouded surfaces. The burner assembly may include one or more deflector plates configured to direct the flow of smoke from the burn pot to the cook chamber.

17 Claims, 6 Drawing Sheets

(56) References Cited

U.S. PATENT DOCUMENTS

| | | |
|---|---|---|
| 2019/0290069 A1 | 9/2019 | Colston et al. |
| 2020/0116349 A1* | 4/2020 | Rahmani ............... F24B 1/1895 |
| 2021/0177200 A1* | 6/2021 | James ...................... F24B 7/04 |
| 2021/0180793 A1* | 6/2021 | James ..................... F24B 13/02 |

OTHER PUBLICATIONS

Australian Examination Report No. 2 for Application No. 2020273348, dated Oct. 21, 2021, 3 pages.
European Search Report for Application No. EP20209901.6 dated Mar. 1, 2021, 6 pages.
Canadian Office Action for Application No. 3,101,542, dated Feb. 15, 2022, 5 pages.

\* cited by examiner

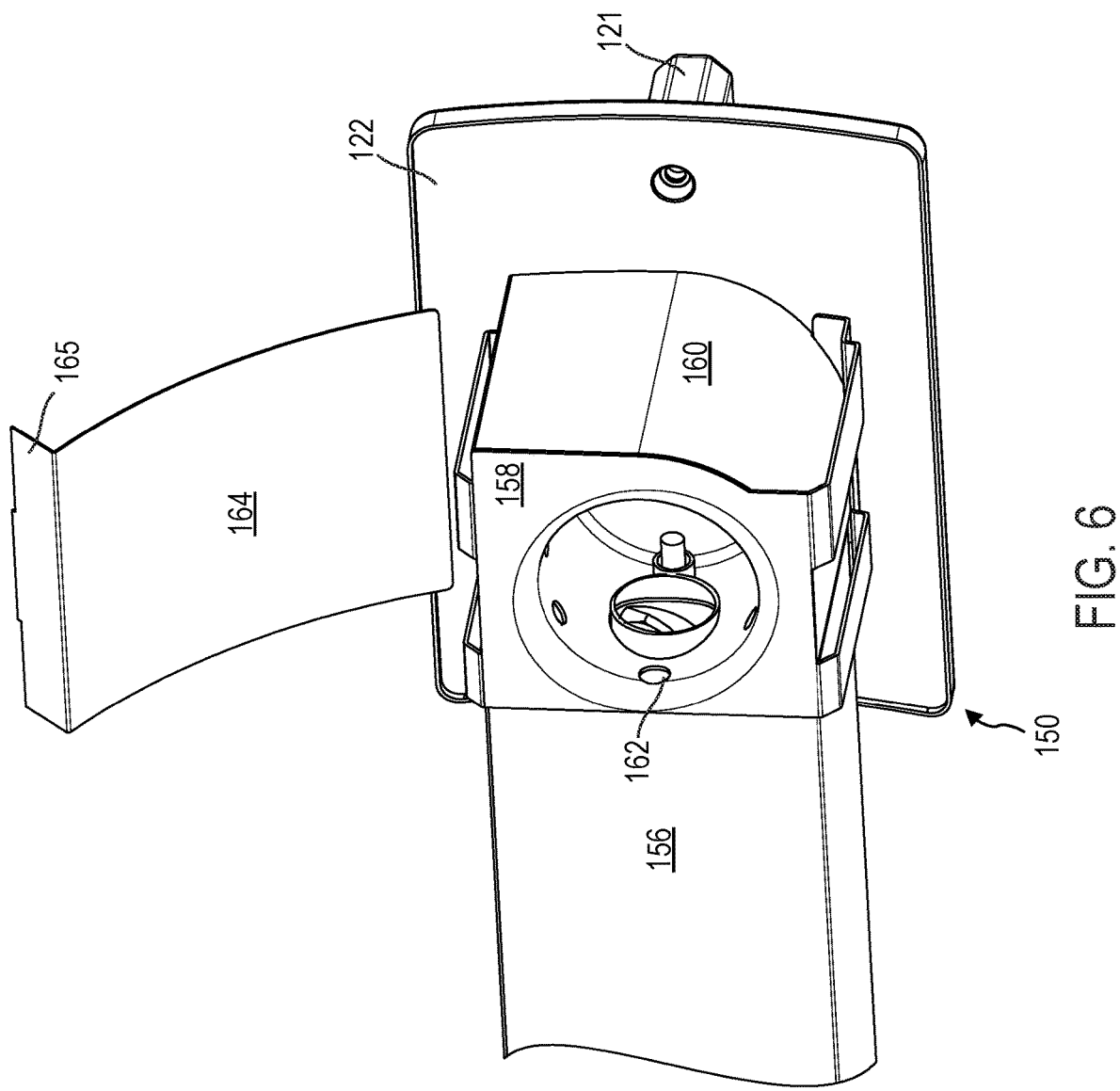

AIR CIRCULATION SYSTEM AND METHOD

TECHNICAL FIELD OF INVENTION

The presently disclosed embodiments relate generally to grills and smokers. More particularly, the presently disclosed embodiments relate to systems and methods for air circulation in a cooking appliance.

BACKGROUND OF THE INVENTION

Smokers are a common outdoor cooking appliance that burn fuel at a low temperature to cause smoke to flow into a cook chamber. The smoke not only cooks the meat within the cook chamber but also provides flavor during the cooking process. Similarly, grills can use a similar process to burn fuel, typically at higher temperatures, to provide a flavor to the food that is difficult to obtain using a conventional indoor cooking appliance.

Pellet grills and smokers are common types of appliances used for cooking meat or other food. These appliances burn pellets of wood based on a temperature of the cook chamber. A user can operate a controller to set the temperature of the cook chamber and the appliance will then burn pellets until the temperature is reached. Thereafter, the appliance will sense that the desired temperature has been reached and will temporarily halt the supply of pellets to avoid heating above the desired temperature, similar to a thermostat system. When the temperature in the cook chamber is detected below the set temperature, a supply of pellets may be introduced and burned to increase the temperature. Users typically favor a pellet grill that provides a large amount of smoke so that the food may exhibit a "smoke ring" and so that the flavor of the pellets penetrates the food.

Pellet grills and smokers typically include a burn pot assembly that combusts the pellets to provide the necessary heat and smoke to the food in the pellet grill. When the pellets are burned, internal airflows driven by the rise of heat and the outer contours of the cooking chamber penetrate the food being cooked.

SUMMARY OF THE INVENTION

The present disclosure provides for a cooking appliance that may include a cooking chamber, a hopper configured to hold a fuel source and a fuel chamber coupled to the hopper. A burn pot may be coupled to the fuel chamber. The burn pot includes at least one shrouded surface and at least one vent. A deflector plate may be disposed adjacent to the burn pot. The deflector plate may be configured to direct an airflow from the burn pot to the cooking chamber.

According to another embodiment, a burner assembly for a cooking appliance is presented. The burner assembly may include a fuel chamber defining an inlet and an outlet and a burn pot coupled to the fuel chamber. The burn pot may be configured to hold a combustible fuel source. The burn pot may also define at least one vent. A deflector plate may be disposed adjacent to the burn pot. The deflector plate may be configured to direct an airflow from the burn pot.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 6 is a perspective view of a burn pot assembly according to at least some of the presently disclosed embodiments.

DETAILED DESCRIPTION

Figure 1:
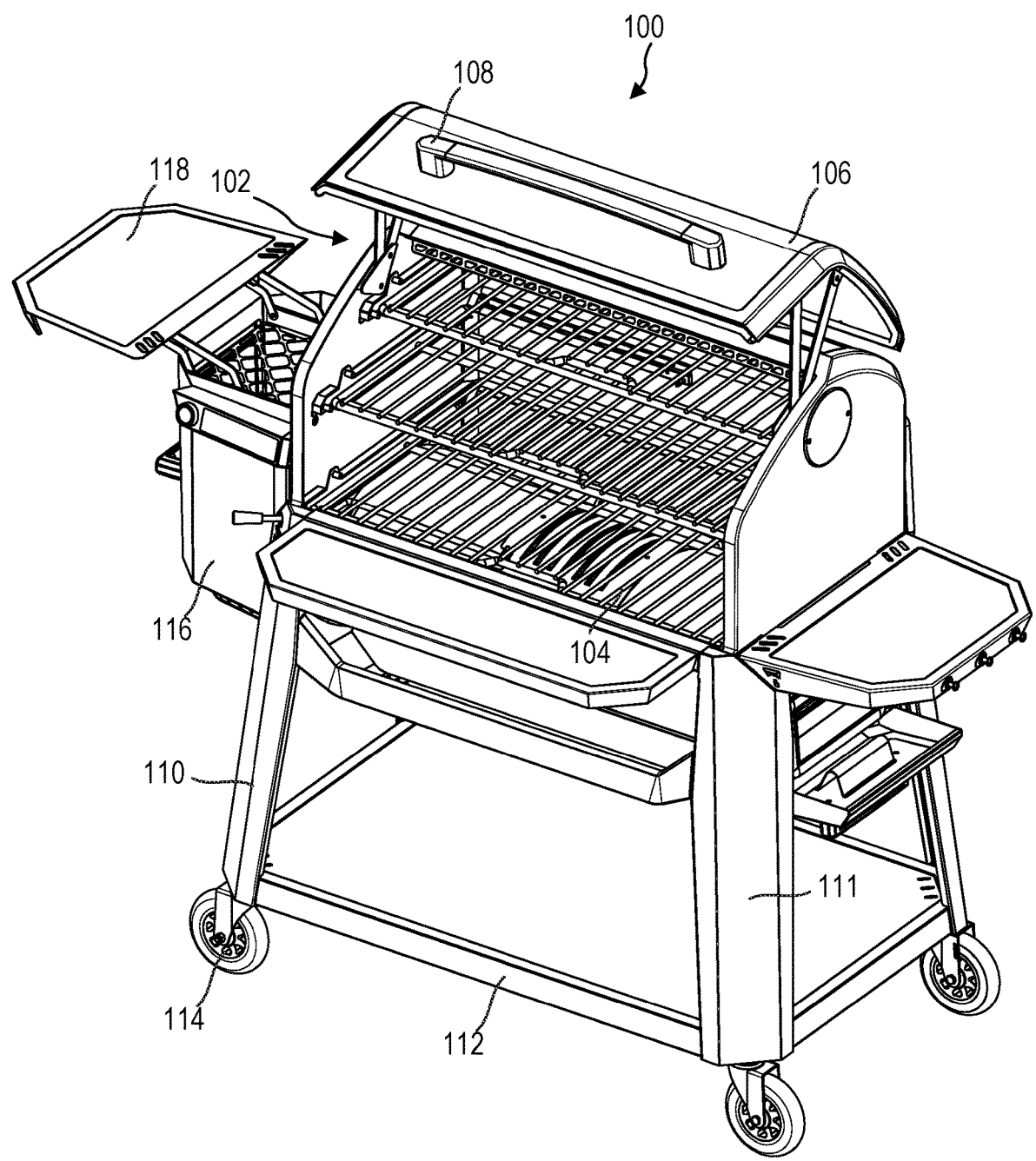
FIG. 1 is front perspective view of an appliance according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include a burner assembly that effectively and efficiently combusts fuel and directs the resulting smoke from a burn pot of the burner assembly to a cook chamber of a cooking appliance, such as a smoker or grill. According to one embodiment, the burner assembly may include a series of openings and curved faces that provide air flow to push smoke from the burn pot to the cook chamber and provide more turbulence and better heat and smoke circulation in the smoker. The burn pot may define one or more vents and include a one or more curved or shrouded surfaces. The burner assembly may include one or more deflector plates configured to direct the flow of smoke from the burn pot to the cook chamber. As a direct consequence of the disclosed burner assembly, more turbulence of smoke, better circulation, and lower velocity smoke occur during the cooking process. The disclosed burner assembly causes more smoke to penetrate the food before exiting, thereby increasing the flavor and more successfully forming a "smoke ring."

Figure 2:
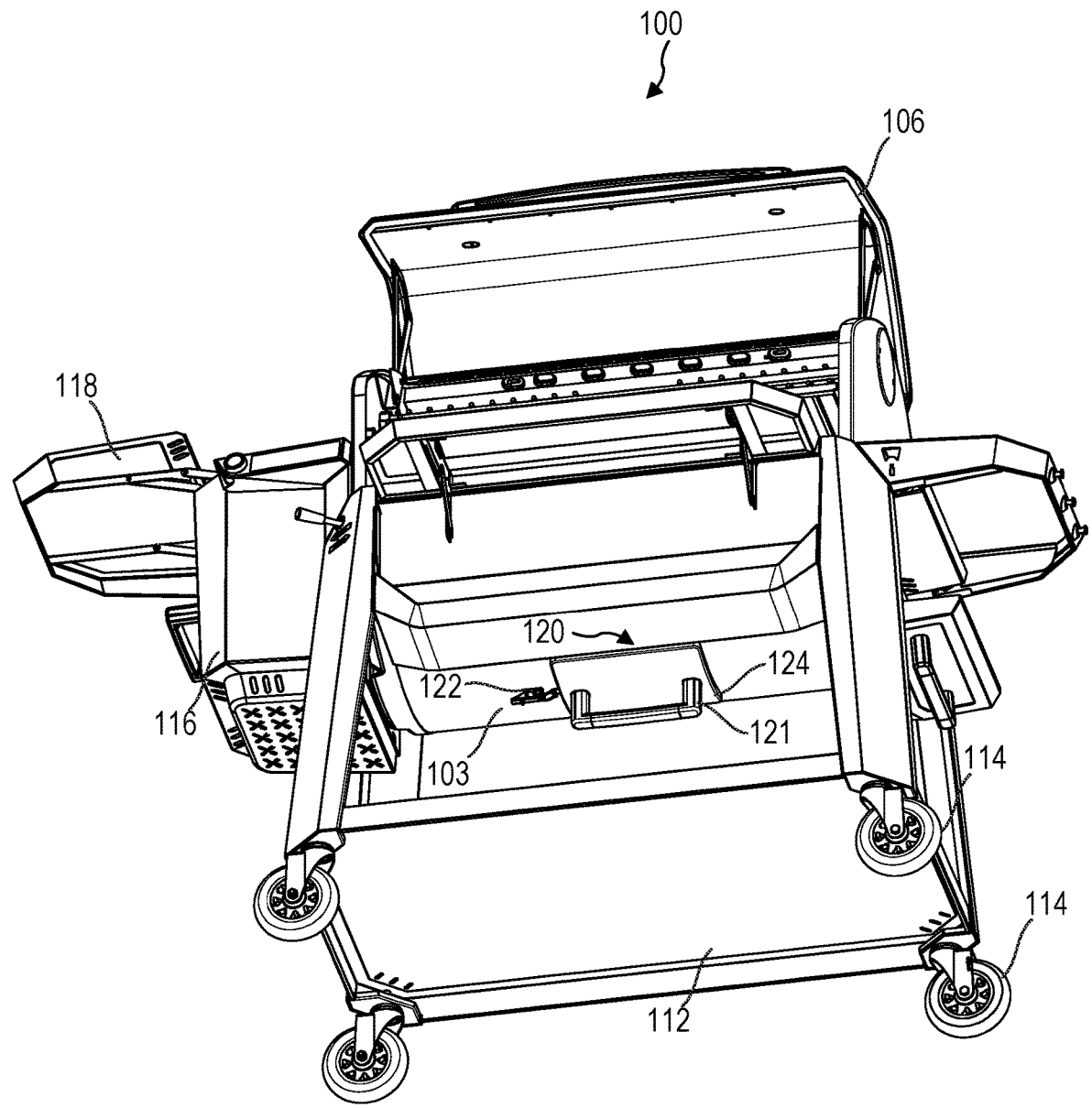
FIG. 2 is a bottom perspective view of an appliance according to at least some of the presently disclosed embodiments.
Figure 3:
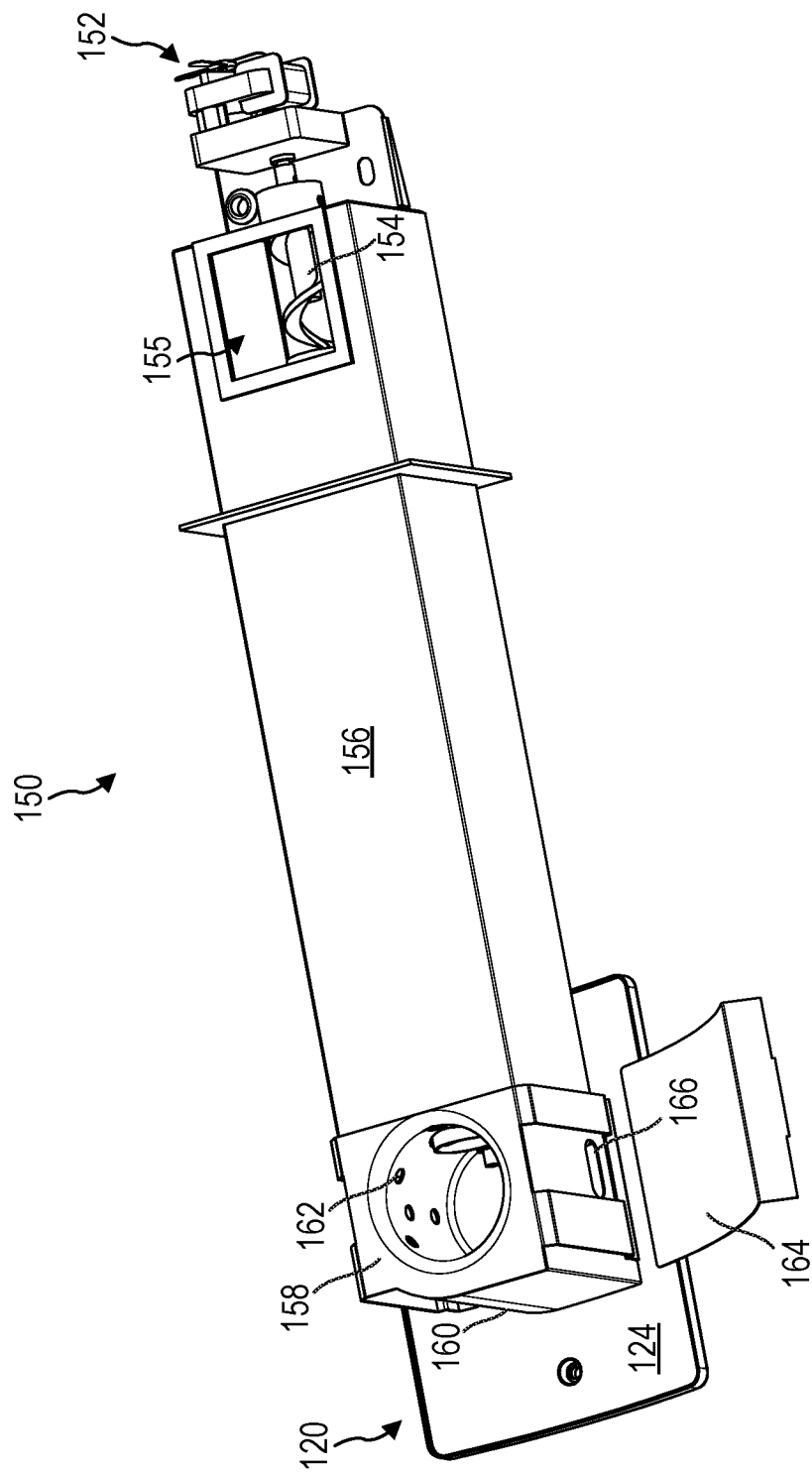
FIG. 3 is a top perspective view of a burner assembly according to at least some of the presently disclosed embodiments.
Figure 4:
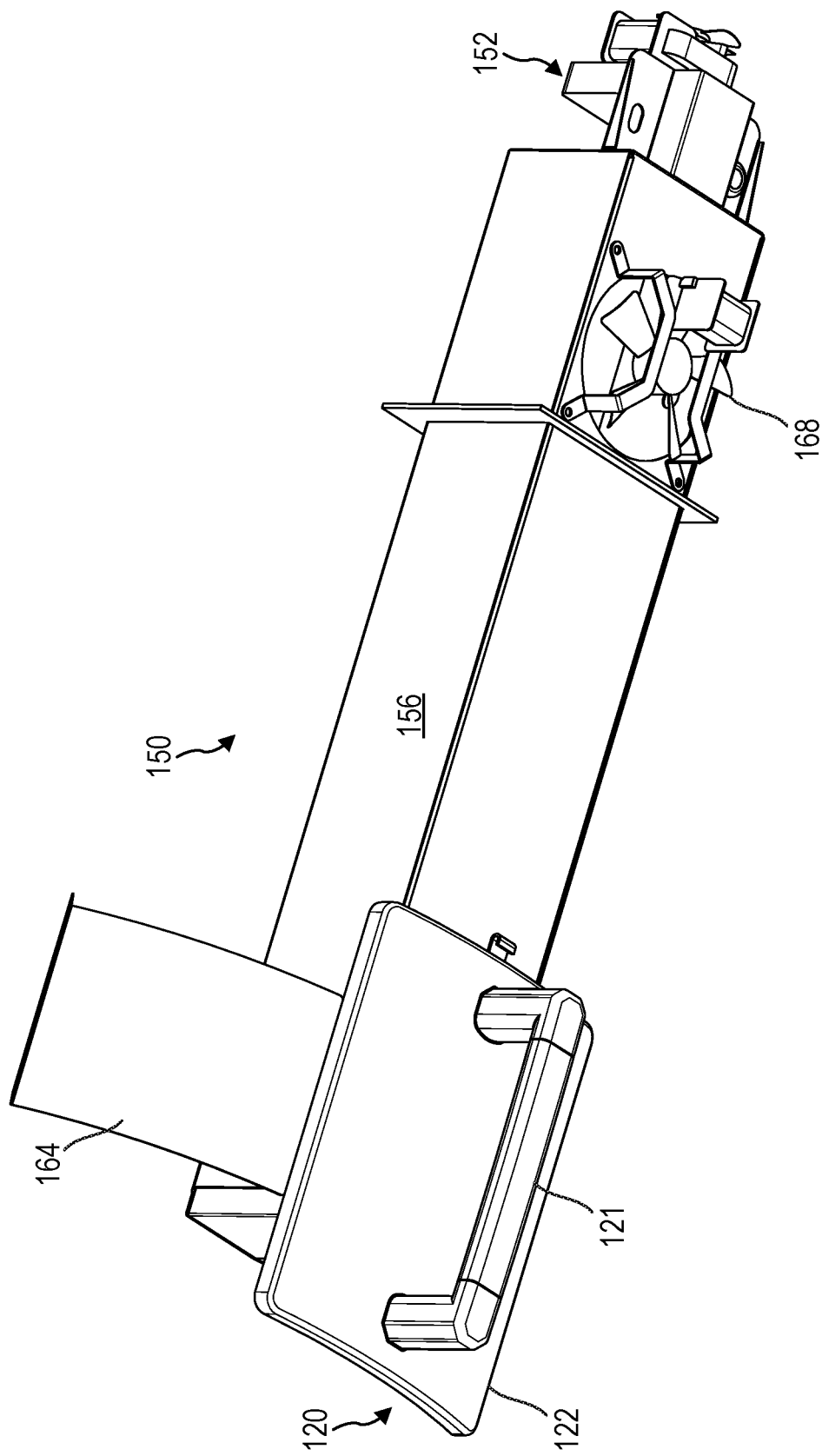
FIG. 4 is a bottom perspective view of a burner assembly according to at least some of the presently disclosed embodiments.
Figure 5:
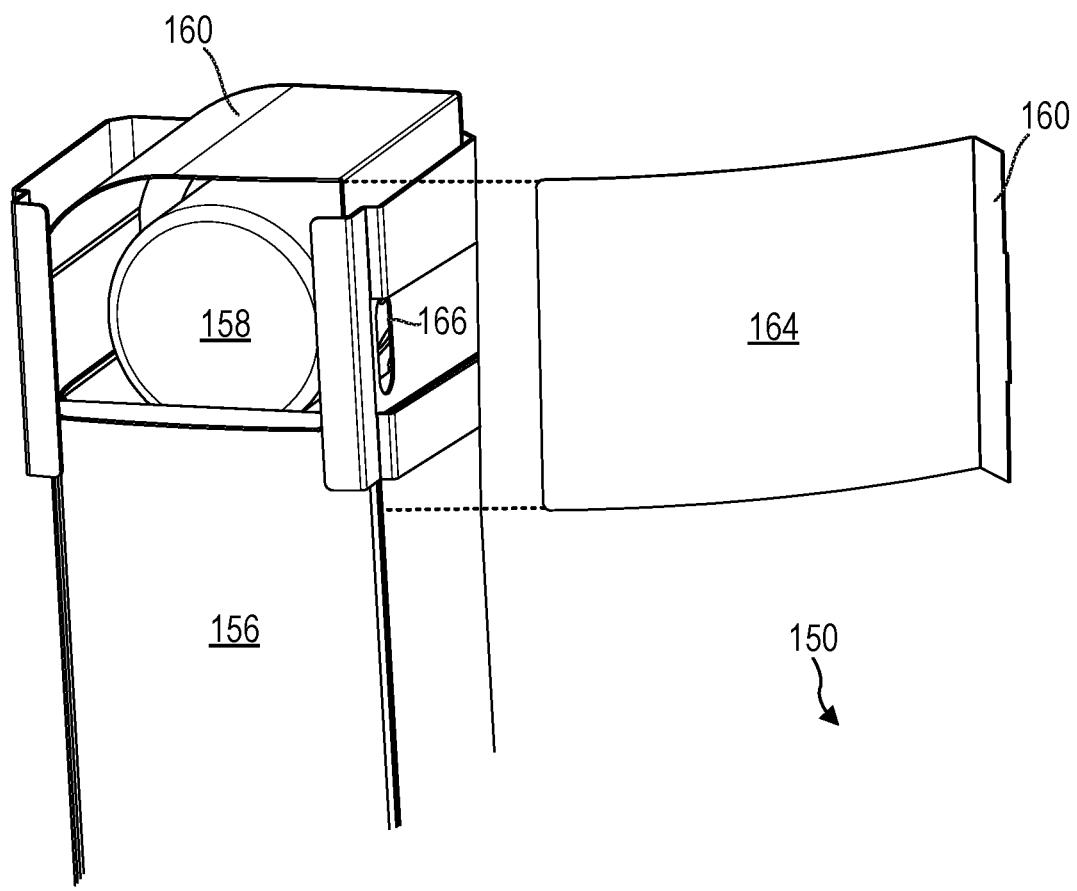
FIG. 5 is a bottom view of a burn pot assembly according to at least some of the presently disclosed embodiments.

FIGS. 1-2 depict a cooking appliance 100, such as a smoker or grill, according to at least one embodiment. The appliance 100 may include or define a cooking chamber 102 configured to hold or support one or more racks 104. Food may be placed on the racks 104 during cooking. The cooking chamber 102 may be closed or covered by a hinged cover 106 that may include a handle 108 to allow a user to open the cover 106 to access the cooking chamber 102. The cooking chamber may be fluidly coupled to a burner assembly (not shown) where smoke and heat are generated. The cooking chamber 102 may be supported by, or be part of a frame 110. The frame 110 may include one or more supporting legs 111, one or more storage shelves 112, and one or more wheels 114 making the appliance moveable or portable. A hopper 116 may be disposed adjacent to the cooking chamber 102. The hopper 116 may be configured to retain and store a fuel source, such as wood pellets, to be burned or otherwise combusted in a burner assembly (not shown) to provide heat to the cooking chamber 102, as is well known in the pellet grill art. The hopper 116 may include a removable lid 118 to protect the fuel source from the outside environment. The underside of the cooking chamber 102 may include a pullout 120 (FIG. 2) coupled to the burner assembly and burn pot (not shown) for easy removal and cleaning. The pullout 120 may include a handle 121 and plate 124 that provides a sealing engagement with underside of the cooking chamber 102. The pullout 120 may be coupled to a retention device 122 or other device that may allow the pullout 120 to hang or otherwise remain removably coupled to the underside of the appliance 100.

FIGS. 3-6 depict a burner assembly 150 according to at least one embodiment of the present disclosure. The burner assembly 150 may be disposed generally under the burn chamber 102 of the appliance such that heat and smoke generated in the burner assembly 150 flows into the burn chamber 102 to act on the food. The burner assembly 150 may include a motor assembly 152, an auger 154, a fuel chamber 156, a burn pot 158, a deflector plate 164 and the pullout 120. The motor assembly 152 may be coupled to the auger 154 that extends into the fuel chamber 156. The fuel chamber may include or define an inlet 155 in communication with the hopper 116, whereby the fuel source may flow from the hopper 116 and into an inlet of the fuel chamber 156. The motor assembly 152 may drive the rotation of the auger 155 and push the fuel source through the fuel chamber 156 to an outlet and to into the burn pot 158. A controller (not shown) may be used to drive the motor assembly according to temperatures sensed in the cooking chamber 102.

The fuel source may be driven by the auger into the burn pot 158 where it may be burned or otherwise combusted. A fan 168 (FIG. 4) may be disposed below the auger 154 and configured to push air into the fuel chamber 156 and the burn pot 158 to aid combustion and create airflow. The burn pot 158 may include or define one or more vents 162 to allow air intake and exhaust of the heat and smoke generated by the burning fuel source.

The burn pot may further include one or more curved or shrouded surfaces 160. The shrouded surface 160 may be a curved sidewall without any vents and configured to direct airflow from the fuel chamber 156 and burn pot 158 out an outlet vent 166. The burner assembly 150 may include a deflector plate 164 coupled to the plate 124 of the pullout 120. The deflector plate 164 may be sized and shaped to direct the airflow of smoke and heat from the burn pot 158 upwards into the cooking chamber 102. According to one aspect, the deflector plate 164 may be substantially curved in a concave manner to direct the flow of smoke and heat upwards towards the cooking chamber 102. The deflector plate may include a flange 165 or tab configured to abut a portion of the cooking chamber 102 or frame 110.

In operation, a user may control the operation of the applicant 100 to ignite a fuel a source such as a wood pellet supply stored in the hopper 116. The pellets may be driven or otherwise displaced from the hopper to the fuel chamber 156 by the rotation of an auger 154. The auger 154 may drive the supply of pellets through the fuel chamber and into the burn pot 158 where the pellets may be ignited. The pellets may begin to burn with assistance from an airflow pushed by the fan 168 pushing air through the fuel chamber 156, into the burn chamber 158 and through the vents 162 and outlet vent 166. As the pellets burn, heat and smoke may be produced. The airflow into the burn put 158 may push the smoke and heat, aided by the shrouded surface 160, out the outlet vent 166 towards the deflector plate 164. The deflector plate 164 may then direct the flow of heat and smoke upwards toward the cooking chamber where the food may absorb the smoke and heat.

The user may specify a temperature to be maintained in the cooking chamber to ensure consistency in the cooking operation. A temperature sensor in the cooking chamber may be coupled to the motor assembly 152 whereby upon a temperature reading below the specified temperature may cause the motor assembly 152 to activate the auger 154 to drive additional pellets into the burn pot 158. The additional pellets may be burned, thereby increasing the heat and smoke flowing into the cooking chamber via the shrouded surface 160 and the deflector plate 164. The configuration of the burn pot 158, shrouded surface 160, outlet vent 166 and deflector plate 164 may create an efficient and effective airflow to provide more smoke turbulence, better circulation, and lower velocity smoke.

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

Although embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A grill or smoker comprising:
   a cooking chamber;
   a hopper configured to hold a fuel source;
   a fuel chamber coupled to the hopper;
   a burn pot coupled to the fuel chamber, the burn pot including a shrouded surface;
   the burn pot defining an outlet vent, wherein heat in the burn pot rises toward a first end of the burn pot and the outlet vent is defined within a second end of the burn pot that is perpendicular to the first end on a side of the burn pot;
   a deflector plate disposed substantially to the side of the burn pot adjacent the outlet vent, the deflector plate configured to direct an airflow from the outlet vent to the cooking chamber, wherein the outlet vent is defined in a portion of the burn pot facing the deflector plate.

2. The grill or smoker of claim 1, wherein the shrouded surface comprises a curved sidewall.

3. The grill or smoker of claim 2, wherein the shrouded surface is substantially opposite the coupling of the burn pot and the fuel chamber.

4. The grill or smoker of claim 1, wherein the deflector plate includes a substantially concave surface.

5. The grill or smoker of claim 1, wherein the deflector plate is disposed below the cooking chamber, the airflow directed upward into the cooking chamber.

6. The grill or smoker of claim 1, further comprising a motor assembly and an auger, the motor assembly configured to rotate the auger, the auger configured to drive the fuel source through the fuel chamber to the burn pot.

7. The grill or smoker of claim 1, wherein the fuel source comprises wood pellets.

8. The grill or smoker of claim 1, further comprising a fan coupled to the fuel chamber, the fan configured to generate and direct the airflow through the fuel chamber and the burn pot.

9. A burner assembly for a grill or smoker, the burner assembly comprising:
   a fuel chamber defining an inlet and an outlet;
   a burn pot coupled to the fuel chamber, the burn pot configured to hold a combustible fuel source;
   the burn pot defining an outlet vent, wherein heat in the burn pot rises toward a first end of the burn pot and the outlet vent is defined within a second end of the burn pot that is perpendicular to the first end on a side of the burn pot;
   a deflector plate disposed to the side of the burn pot adjacent the outlet vent;
   the deflector plate configured to direct an airflow from the outlet vent, wherein the outlet vent is defined in a portion of the burn pot facing the deflector plate.

10. The burner assembly of claim 9, wherein the shrouded surface comprises a curved sidewall.

11. The burner assembly of claim 10, wherein the shrouded surface is substantially opposite the coupling of the burn pot and the fuel chamber.

12. The burner assembly of claim 9, wherein the deflector plate includes a substantially concave surface.

13. The burner assembly of claim 12, wherein the deflector plate is disposed below a cooking chamber of a grill or smoker, the airflow directed upward into the cooking chamber.

14. The burner assembly of claim 13, wherein the grill or smoker includes a hopper configured to retain the fuel source, the hopper in fluid communication with the inlet of the fuel chamber.

15. The burner assembly of claim 9, further comprising a motor assembly and an auger, the motor assembly configured to rotate the auger, the auger configured to drive the fuel source through the fuel chamber to the burn pot.

16. The burner assembly of claim 9, wherein the fuel source comprises wood pellets.

17. The burner assembly of claim 9, further comprising a fan coupled to the fuel chamber, the fan configured to generate and direct the airflow through the fuel chamber and the burn pot.

* * * * *